United States Patent
Lin et al.

(10) Patent No.: US 10,249,446 B2
(45) Date of Patent: Apr. 2, 2019

(54) STACKED-TYPE SOLID ELECTROLYTIC CAPACITOR PACKAGE STRUCTURE AND METHOD OF MANUFACTURING THE SAME

(71) Applicant: APAQ TECHNOLOGY CO., LTD., Miaoli County (TW)

(72) Inventors: Chien-Wei Lin, Miaoli County (TW); Shang-Che Lan, Kaohsiung (TW); Ming-Tsung Chen, Changhua County (TW)

(73) Assignee: APAQ TECHNOLOGY CO., LTD., Miaoli County (TW)

( * ) Notice: Subject to any disclaimer, the term of this patent is extended or adjusted under 35 U.S.C. 154(b) by 0 days.

(21) Appl. No.: 15/644,901

(22) Filed: Jul. 10, 2017

(65) Prior Publication Data

US 2018/0108493 A1   Apr. 19, 2018

(30) Foreign Application Priority Data

Oct. 14, 2016   (TW) .............................. 105133289 A

(51) Int. Cl.
| | |
|---|---|
| H01G 9/012 | (2006.01) |
| H01G 9/15 | (2006.01) |
| H01G 9/26 | (2006.01) |
| H01G 9/10 | (2006.01) |
| H01G 9/00 | (2006.01) |
| H01G 9/08 | (2006.01) |

(52) U.S. Cl.
CPC ............. *H01G 9/26* (2013.01); *H01G 9/0029* (2013.01); *H01G 9/012* (2013.01); *H01G 9/08* (2013.01); *H01G 9/10* (2013.01); *H01G 9/15* (2013.01)

(58) Field of Classification Search
CPC ......... H01G 9/025; H01G 9/016; H01G 9/012
USPC ......................................................... 361/329
See application file for complete search history.

(56) References Cited

U.S. PATENT DOCUMENTS

| | | | | |
|---|---|---|---|---|
| 7,138,713 B2* | 11/2006 | Kida | ...................... | H01G 9/008 |
| | | | | 257/732 |
| 2011/0216475 A1* | 9/2011 | Chiu | ....................... | H01G 9/00 |
| | | | | 361/434 |

* cited by examiner

Primary Examiner — Eric W Thomas
(74) Attorney, Agent, or Firm — Li & Cai Intellectual Property (USA) Office

(57) ABSTRACT

The present disclosure provides a stacked-type solid electrolytic capacitor package structure and a method of manufacturing the same. The capacitor package structure includes a capacitor unit, a solder unit, a package unit and a conductive unit. The capacitor unit includes a plurality of first stacked capacitors. Each first stacked capacitor includes a first positive portion and a first negative portion. The first positive portion has at least one first through hole. The first through holes of the first positive portions are in communication with each other to form a first communication hole. The solder unit includes a first connection solder for filling the first communication hole so as to connect the first positive portions with each other. The package unit includes a package body for enclosing the capacitor unit and the solder unit. The conductive unit includes a first conductive terminal and a second conductive terminal.

4 Claims, 9 Drawing Sheets

STACKED-TYPE SOLID ELECTROLYTIC CAPACITOR PACKAGE STRUCTURE AND METHOD OF MANUFACTURING THE SAME

FIELD OF THE INVENTION

The present disclosure relates to a capacitor package structure and a method of manufacturing the same, and more particularly to a stacked-type solid electrolytic capacitor package structure and a method of manufacturing the same.

BACKGROUND OF THE INVENTION

Various applications of capacitors include home appliances, computer motherboards and peripherals, power supplies, communication products and automobiles. The capacitors such as solid electrolytic capacitors are mainly used to provide filtering, bypassing, rectifying, coupling, blocking or transforming function. Because the solid electrolytic capacitor has the advantages of small size, large electrical capacitance and good frequency characteristic, it can be used as a decoupling element in the power circuit of a central processing unit (CPU).

In general, a plurality of capacitor elements is stacked together to form a stacked solid electrolytic capacitor with a high electrical capacitance. In addition, the stacked solid electrolytic capacitor of the prior art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE INVENTION

One aspect of the present disclosure relates to a stacked-type solid electrolytic capacitor package structure and a method of manufacturing the same.

One of the embodiments of the present disclosure provides a stacked-type solid electrolytic capacitor package structure, including a capacitor unit, a solder unit, a package unit and a conductive unit. The capacitor unit includes a plurality of first stacked capacitors stacked on top of one another and electrically connected with each other, in which each first stacked capacitor includes a first positive portion and a first negative portion, the first positive portion of each first stacked capacitor has at least one first through hole formed on a lateral side thereof, and the first through holes of the first positive portions of the first stacked capacitors are in communication with each other to form a first communication hole. The solder unit includes at least one first connection solder for filling the first communication hole, and the first positive portions of the first stacked capacitors are connected with each other by the at least one first connection solder. The package unit includes a package body for enclosing the capacitor unit and the solder unit. The conductive unit includes a first conductive terminal and a second conductive terminal separated from the first conductive terminal. The first conductive terminal has a first embedded portion electrically connected to the first positive portion of the first stacked capacitor and enclosed by the package body, and a first exposed portion connected to the first embedded portion and exposed outside the package body. The second conductive terminal has a second embedded portion electrically connected to the first negative portion of the first stacked capacitor and enclosed by the package body, and a second exposed portion connected to the second embedded portion and exposed outside the package body.

Another one of the embodiments of the present disclosure provides a stacked-type solid electrolytic capacitor package structure, including a capacitor unit, a solder unit, a package unit and a conductive unit. The capacitor unit includes a plurality of first stacked capacitors stacked on top of one another and electrically connected with each other, in which each first stacked capacitor includes a first positive portion and a first negative portion, the first positive portion of each first stacked capacitor has at least one first lateral connection surface, and the first lateral connection surfaces of the first positive portions of the first stacked capacitors are in communication with each other to form a first lateral connection area. The solder unit includes at least one first connection solder disposed on the at least one first lateral connection area, and the first positive portions of the first stacked capacitors are connected with each other by the at least one first connection solder. The package unit includes a package body for enclosing the capacitor unit and the solder unit. The conductive unit includes a first conductive terminal and a second conductive terminal separated from the first conductive terminal. The first conductive terminal has a first embedded portion electrically connected to the first positive portion of the first stacked capacitor and enclosed by the package body, and a first exposed portion connected to the first embedded portion and exposed outside the package body. The second conductive terminal has a second embedded portion electrically connected to the first negative portion of the first stacked capacitor and enclosed by the package body, and a second exposed portion connected to the second embedded portion and exposed outside the package body.

Yet another one of the embodiments of the present disclosure provides a method of manufacturing a stacked-type solid electrolytic capacitor package structure, including providing a first conductive terminal and a second conductive terminal; electrically connecting a capacitor unit between the first conductive terminal and the second conductive terminal, in which the capacitor unit includes a plurality of first stacked capacitors stacked on top of one another and electrically connected with each other, each first stacked capacitor includes a first positive portion and a first negative portion, the first positive portion of each first stacked capacitor has at least one first through hole formed on a lateral side thereof, and the first through holes of the first positive portions of the first stacked capacitors are in communication with each other to form a first communication hole; placing a first soldering bar into the first communication hole; projecting a first light source onto the first soldering bar so as to change the first soldering bar into at least one first connection solder for filling the first communication hole, in which the first positive portions of the first stacked capacitors are connected with each other by the at least one first connection solder; forming a package body to enclose the first stacked capacitors and the at least one first connection solder, in which the first conductive terminal has a first embedded portion electrically connected to the first positive portion of the first stacked capacitor and enclosed by the package body, and a first exposed portion connected to the first embedded portion and exposed outside the package body, in which the second conductive terminal has a second embedded portion electrically connected to the first negative portion of the first stacked capacitor and enclosed by the package body, and a second exposed portion connected to the second embedded portion and exposed outside the package body; and then bending the first exposed portion and the second exposed portion so as to extend the first exposed portion and the second exposed portion along an outer surface of the package body.

Therefore, the first positive portion of each first stacked capacitor has at least one first through hole formed on a lateral side thereof, and the first through holes of the first positive portions of the first stacked capacitors are in communication with each other to form a first communication hole, so that when the first communication hole is filled with at least one first connection solder, the first positive portions of the first stacked capacitors can be connected with each other by the at least one first connection solder.

Furthermore, the first positive portion of each first stacked capacitor has at least one first lateral connection surface, and the first lateral connection surfaces of the first positive portions of the first stacked capacitors are in communication with each other to form a first lateral connection area, so that so that when at least one first connection solder is disposed on the at least one first lateral connection area, the first positive portions of the first stacked capacitors can be connected with each other by the at least one first connection solder.

To further understand the techniques, means and effects of the present disclosure, the following detailed descriptions and appended drawings are hereby referred to, such that, and through which, the purposes, features and aspects of the present disclosure can be thoroughly and concretely appreciated. However, the appended drawings are provided solely for reference and illustration, without any intention to limit the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DETAILED DESCRIPTION OF THE PREFERRED EMBODIMENTS

Embodiments of a stacked-type solid electrolytic capacitor package structure and a method of manufacturing the same according to the present disclosure are described herein. Other advantages and objectives of the present disclosure can be easily understood by one skilled in the art from the disclosure. The present disclosure can be applied in different embodiments. Various modifications and variations can be made to various details in the description for different applications without departing from the scope of the present disclosure. The drawings of the present disclosure are provided only for simple illustrations, but are not drawn to scale and do not reflect the actual relative dimensions. The following embodiments are provided to describe in detail the concept of the present disclosure, and are not intended to limit the scope thereof in any way.

Figure 1:
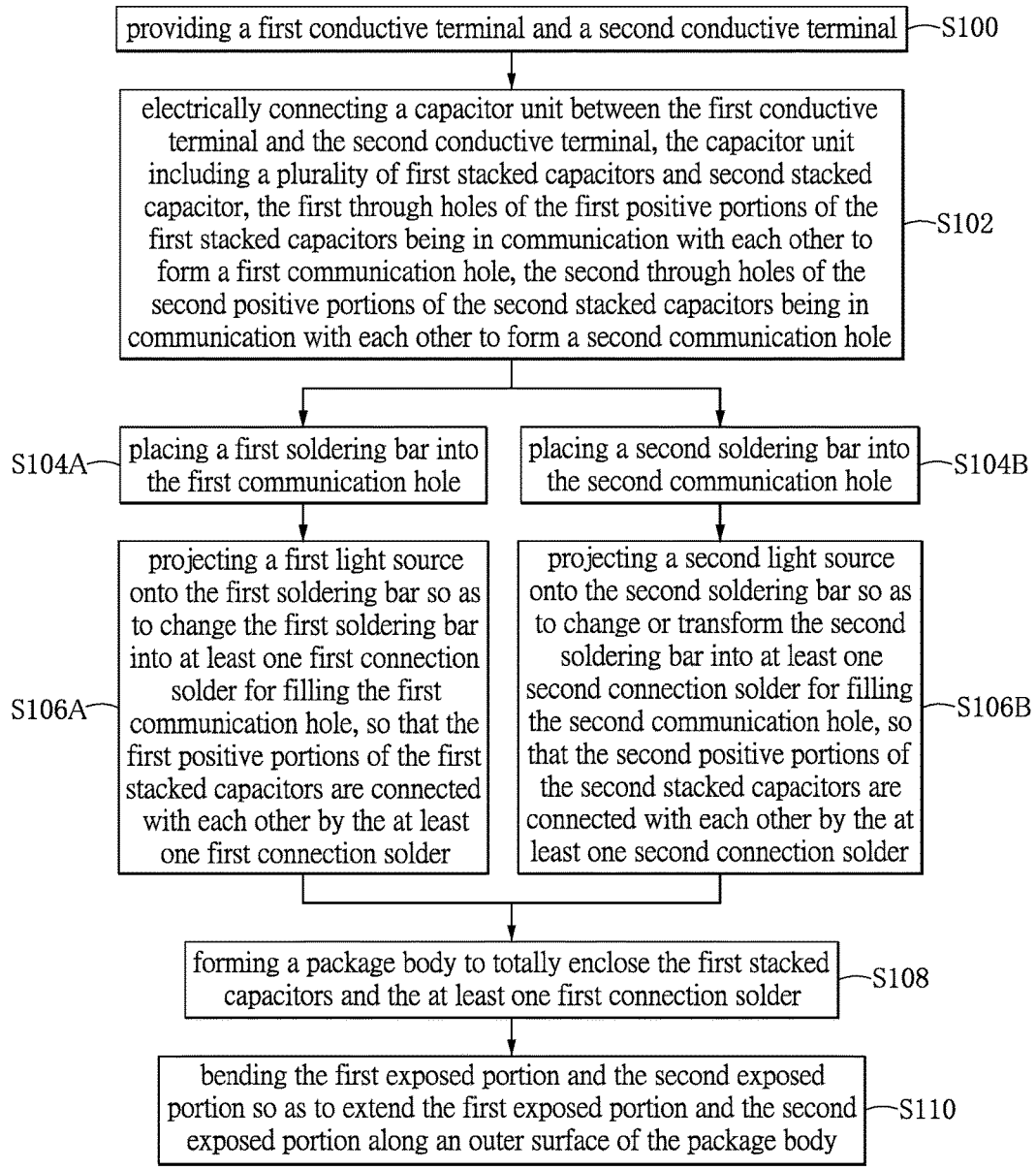
FIG. 1 shows a flowchart of a method of manufacturing a stacked-type solid electrolytic capacitor package structure according to the present disclosure.
Figure 2:
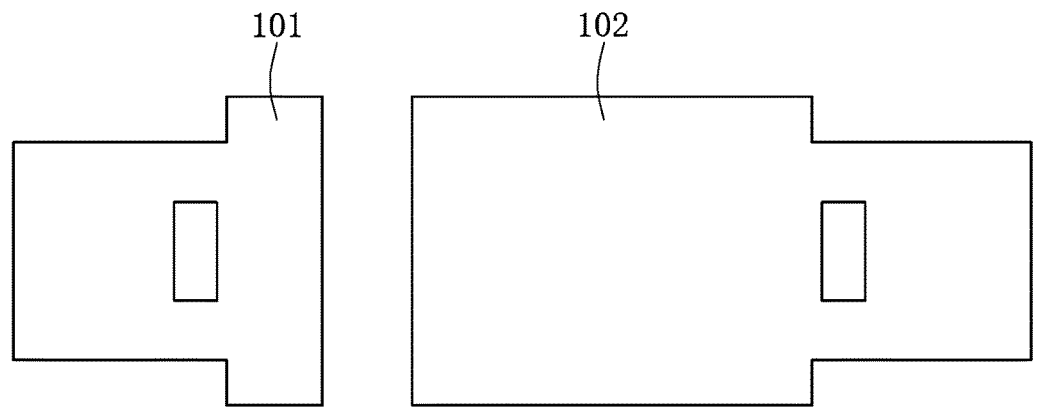
FIG. 2 shows a schematic view of step S100 of the method of manufacturing the stacked-type solid electrolytic capacitor package structure according to the present disclosure.
Figure 3:
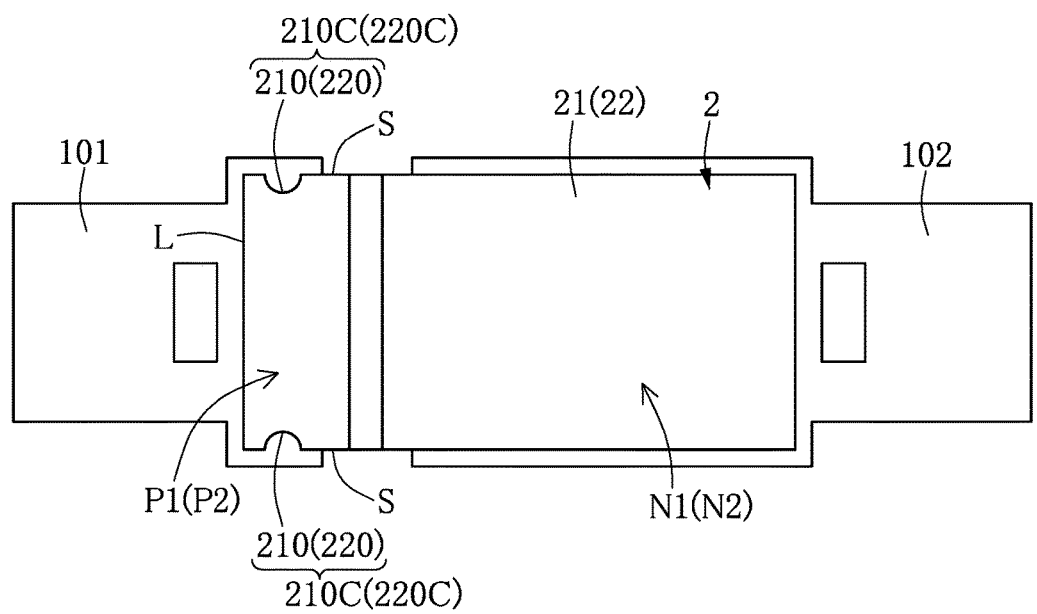
FIG. 3 shows a schematic view of step S102 of the method of manufacturing the stacked-type solid electrolytic capacitor package structure according to the present disclosure.
Figure 4:
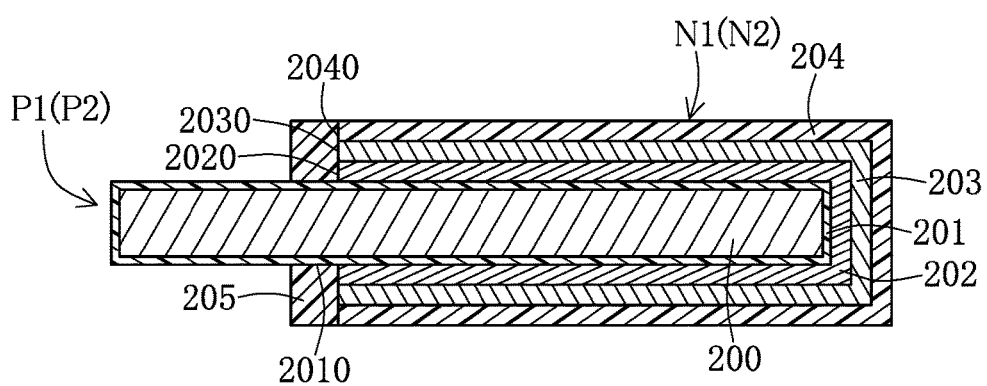
FIG. 4 shows a cross-sectional schematic view of a first stacked capacitor or a second stacked capacitor according to the present disclosure.

Referring to FIG. 1 to FIG. 8, the present disclosure provides a method of manufacturing a stacked-type solid electrolytic capacitor package structure Z, including the following steps:

First, referring to FIG. 1 and FIG. 2, providing a first conductive terminal 101 and a second conductive terminal 102 (step S100), in which the first conductive terminal 101 and the second conductive terminal 102 are one portion of a lead frame (not shown); next, referring FIG. 1, FIG. 3 and FIG. 4, electrically connecting a capacitor unit 2 between the first conductive terminal 101 and the second conductive terminal 102 (step S102). More particularly, the capacitor unit 2 includes a plurality of first stacked capacitors 21 stacked on top of one another and electrically connected with each other, and each first stacked capacitor 21 includes a first positive portion P1 and a first negative portion N1. The first positive portion P1 of each first stacked capacitor 21 has at least one first through hole 210 (such as a half hole or a chadless) formed on a lateral side thereof, and the first through holes 210 of the first positive portions P1 of the first stacked capacitors 21 are in communication with each other to form a first communication hole 210C.

For example, referring to FIG. 3, the first positive portion P1 of each first stacked capacitor 21 has a long lateral surface L and two short lateral surfaces S respectively connected to two opposite sides of the long lateral surface L, and the at least one first through hole 210 of the first positive portion P1 of each first stacked capacitor 21 is alternatively formed on the long lateral surface L or the short lateral surface S of the first positive portion P1. For example, the first positive portion P1 of each first stacked capacitor 21 has at least two first through holes 210 formed on the short lateral surface S of the first positive portion P1 as shown in FIG. 3.

For another example, as shown in FIG. 4, each first stacked capacitor 21 includes a valve metal foil 200, an oxide layer 201 for totally enclosing the valve metal foil 200, a conductive polymer layer 202 for partially enclosing the oxide layer 201, a carbon paste layer 203 for totally enclosing the conductive polymer layer 202, and a silver paste layer 204 for totally enclosing the carbon paste layer 203. In addition, each first stacked capacitor 21 has a surrounding insulation layer 205 disposed on and around an outer surface of the oxide layer 201, and the lengths of the conductive polymer layer 202, the carbon paste layer 203 and the silver paste layer 204 of each first stacked capacitor 21 are limited or restricted by the surrounding insulation layer 205. More particularly, the oxide layer 201 has a surrounding region 2010 formed on the outer surface thereof, and the surrounding insulation layer 205 of each first stacked capacitor 21 is surroundingly disposed on the surrounding region 2010 of the oxide layer 201 to concurrently contact an end 2020 of the conductive polymer layer 202, an end 2030 of the carbon paste layer 203, and an end 2040 of the silver paste layer 204. It should be noted that the aforementioned description for the first stacked capacitor 21 of the first exemplary embodiment is merely an example and is not meant to limit the scope of the present disclosure.

Figure 5:
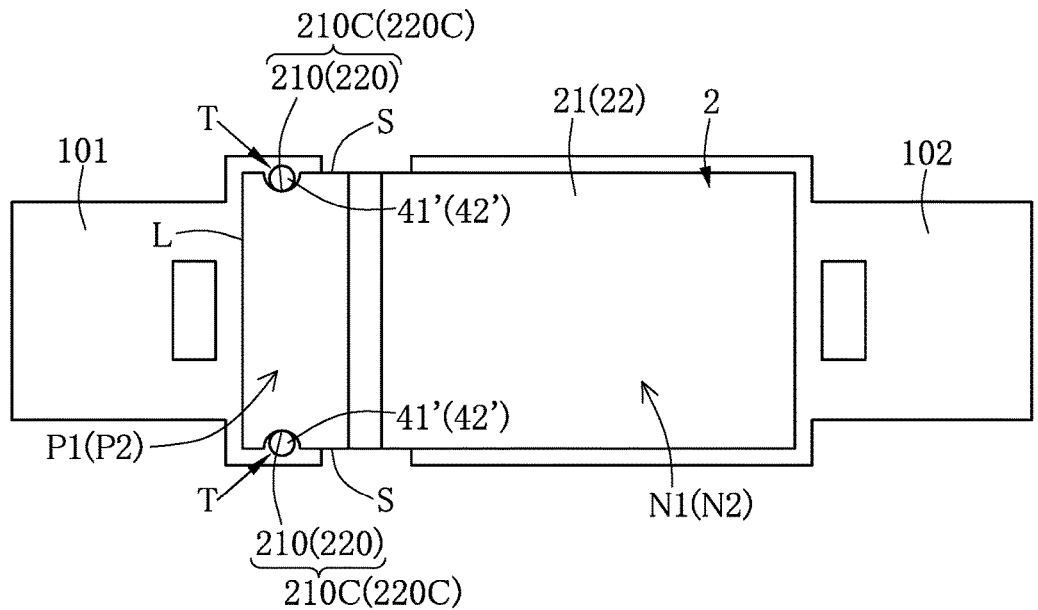
FIG. 5 shows a schematic view of step S104A or S104B of the method of manufacturing the stacked-type solid electrolytic capacitor package structure according to the present disclosure.
Figure 6:
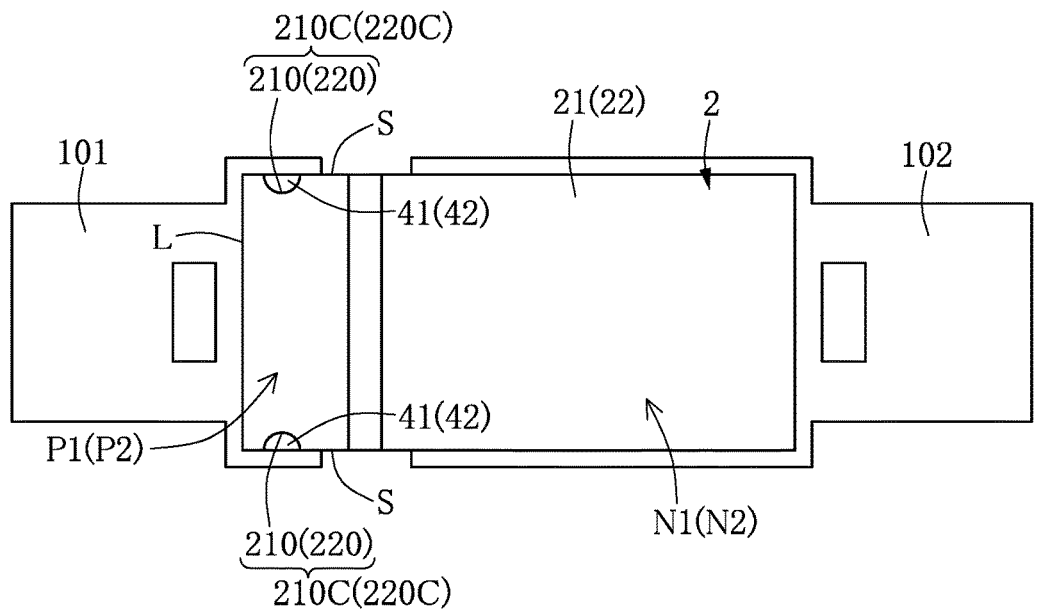
FIG. 6 shows a schematic view of step S106A or S106B of the method of manufacturing the stacked-type solid electrolytic capacitor package structure according to the present disclosure.

Next, referring to FIG. 1 and FIG. 5, placing a first soldering bar 41' into the first communication hole 210C (step S104A), and then referring to FIG. 1, FIG. 5 and FIG. 6, projecting a first light source T onto the first soldering bar 41' so as to change or transform the first soldering bar 41' into at least one first connection solder 41 for filling the first communication hole 210C, in which the first positive portions P1 of the first stacked capacitors 21 are connected with each other by the at least one first connection solder 41 (step S106A). For example, the first soldering bar 41' may be a tin wire or any metal wire that can be melted by the first light source T. In addition, the first light source T may be an excitation light such as a laser beam generated by a light generating device.

It should be noted that the first positive portions P1 of the first stacked capacitors 21 are connected with each other by the at least one first connection solder 41 so as to decrease the whole thickness of the first positive portions P1 of the first stacked capacitors 21 and increase the connection speed of the first positive portions P1 of the first stacked capacitors 21, so that the electrical impedance of the stacked-type solid electrolytic capacitor package structure Z can be decreased, and the electronic property of the stacked-type solid electrolytic capacitor package structure Z can be increased.

Figure 7:
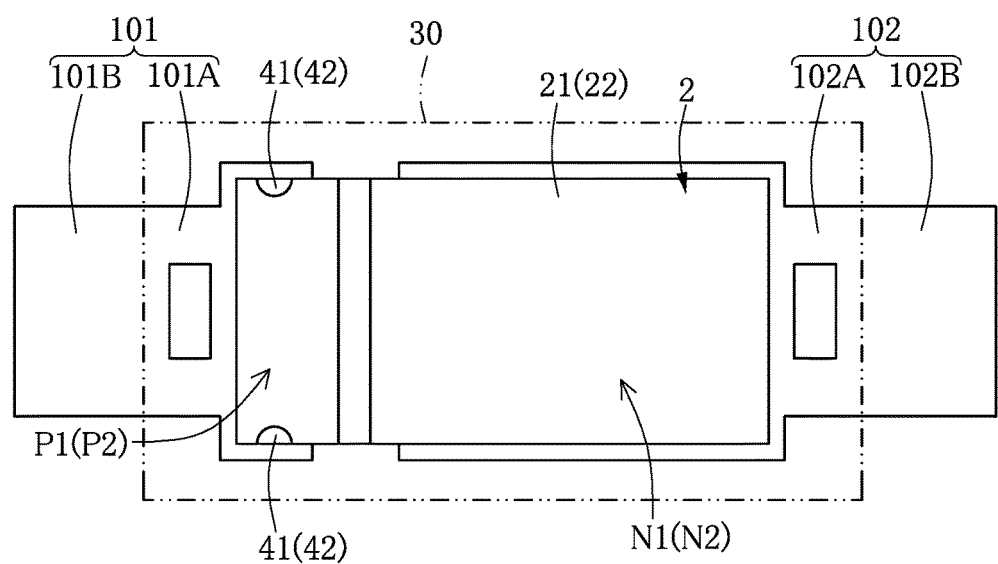
FIG. 7 shows a schematic view of step S108 of the method of manufacturing the stacked-type solid electrolytic capacitor package structure according to the present disclosure.

Afterward, referring to FIG. 1 and FIG. 7, forming a package body 30 to totally enclose the first stacked capacitors 21 and the at least one first connection solder 41 (step S108). More particularly, the first conductive terminal 101 has a first embedded portion 101A electrically connected to the first positive portion P1 of the first stacked capacitor 21 and enclosed by the package body 30, and a first exposed portion 101B connected to the first embedded portion 101A and exposed outside the package body 30. The second conductive terminal 102 has a second embedded portion 102A electrically connected to the first negative portion N1 of the first stacked capacitor 21 and enclosed by the package body 30, and a second exposed portion 102B connected to the second embedded portion 102A and exposed outside the package body 30.

Figure 8:
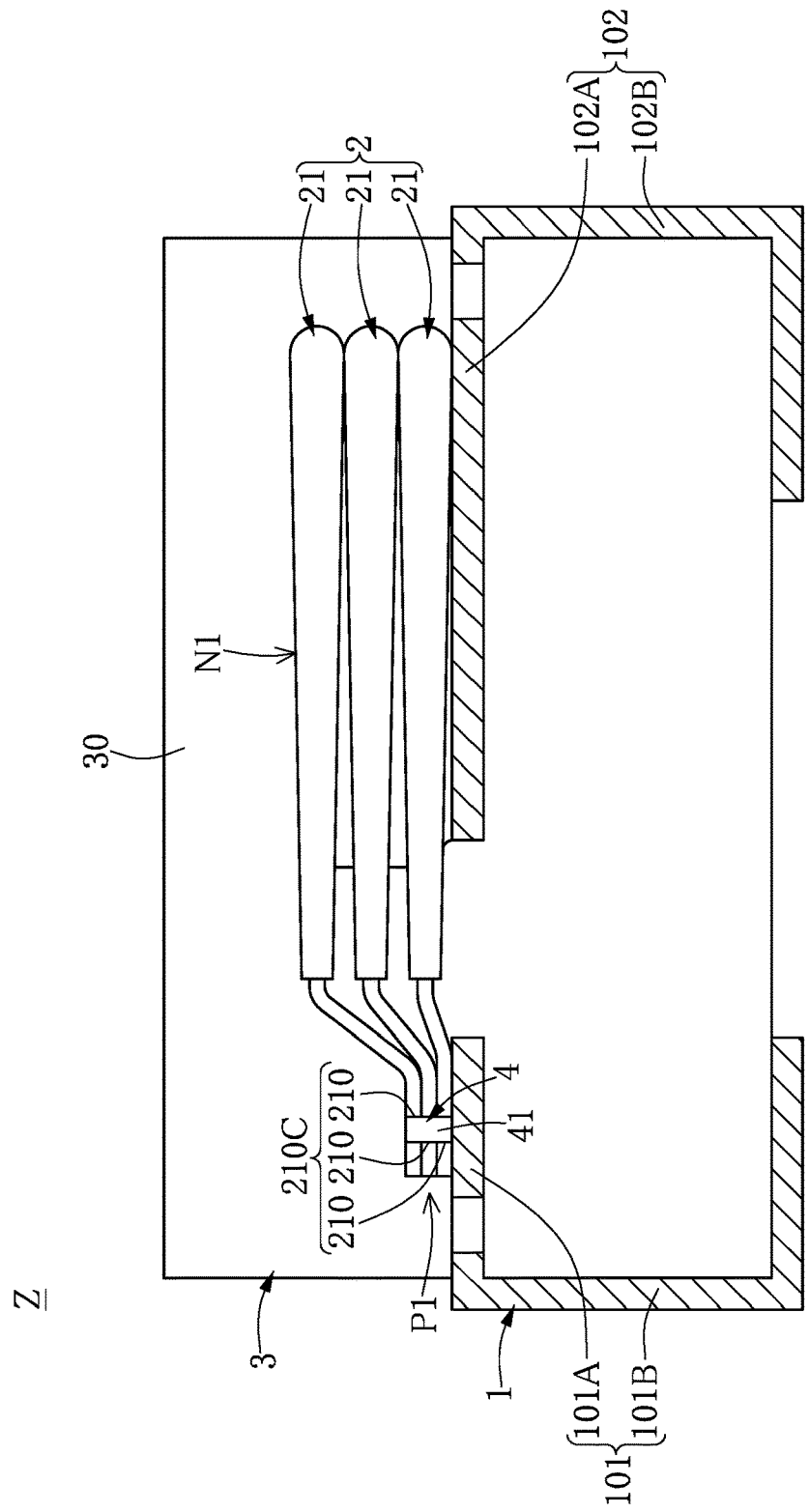
FIG. 8 shows a partial cross-sectional schematic view of the stacked-type solid electrolytic capacitor package structure according to one of embodiments of the present disclosure.

Finally, referring to FIG. 1 and FIG. 8, bending the first exposed portion 101B and the second exposed portion 102B so as to extend the first exposed portion 101B and the second exposed portion 102B along an outer surface of the package body 30 (step S110).

Therefore, referring to FIG. 1, FIG. 3 and FIG. 8, the present disclosure provides a stacked-type solid electrolytic capacitor package structure Z, including a capacitor unit 2, a solder unit 4, a package unit 3 and a conductive unit 1. The capacitor unit 2 includes a plurality of first stacked capacitors 21 stacked on top of one another and electrically connected with each other. Each first stacked capacitor 21 includes a first positive portion P1 and a first negative portion N1. The first positive portion P1 of each first stacked capacitor 21 has at least one first through hole 210 formed on a lateral side thereof, and the first through holes 210 of the first positive portions P1 of the first stacked capacitors 21 are in communication with each other to form a first communication hole 210C. Moreover, the solder unit 4 includes at least one first connection solder 41 for filling the first communication hole 210C, so that the first positive portions P1 of the first stacked capacitors 21 can be connected with each other by the at least one first connection solder 41. In addition, the package unit 3 includes a package body 30 for totally enclosing the capacitor unit 2 and the solder unit 4. Furthermore, the conductive unit 1 includes a first conductive terminal 101 and a second conductive terminal 102 separated from the first conductive terminal 101. The first conductive terminal 101 has a first embedded portion 101A electrically connected to the first positive portion P1 of the first stacked capacitor 21 and enclosed by the package body 30, and a first exposed portion 101B connected to the first embedded portion 101A and exposed outside the package body 30. The second conductive terminal 102 has a second embedded portion 102A electrically connected to the first negative portion N1 of the first stacked capacitor 21 and enclosed by the package body 30, and a second exposed portion 102B connected to the second embedded portion 102A and exposed out of the package body 30.

Figure 9:
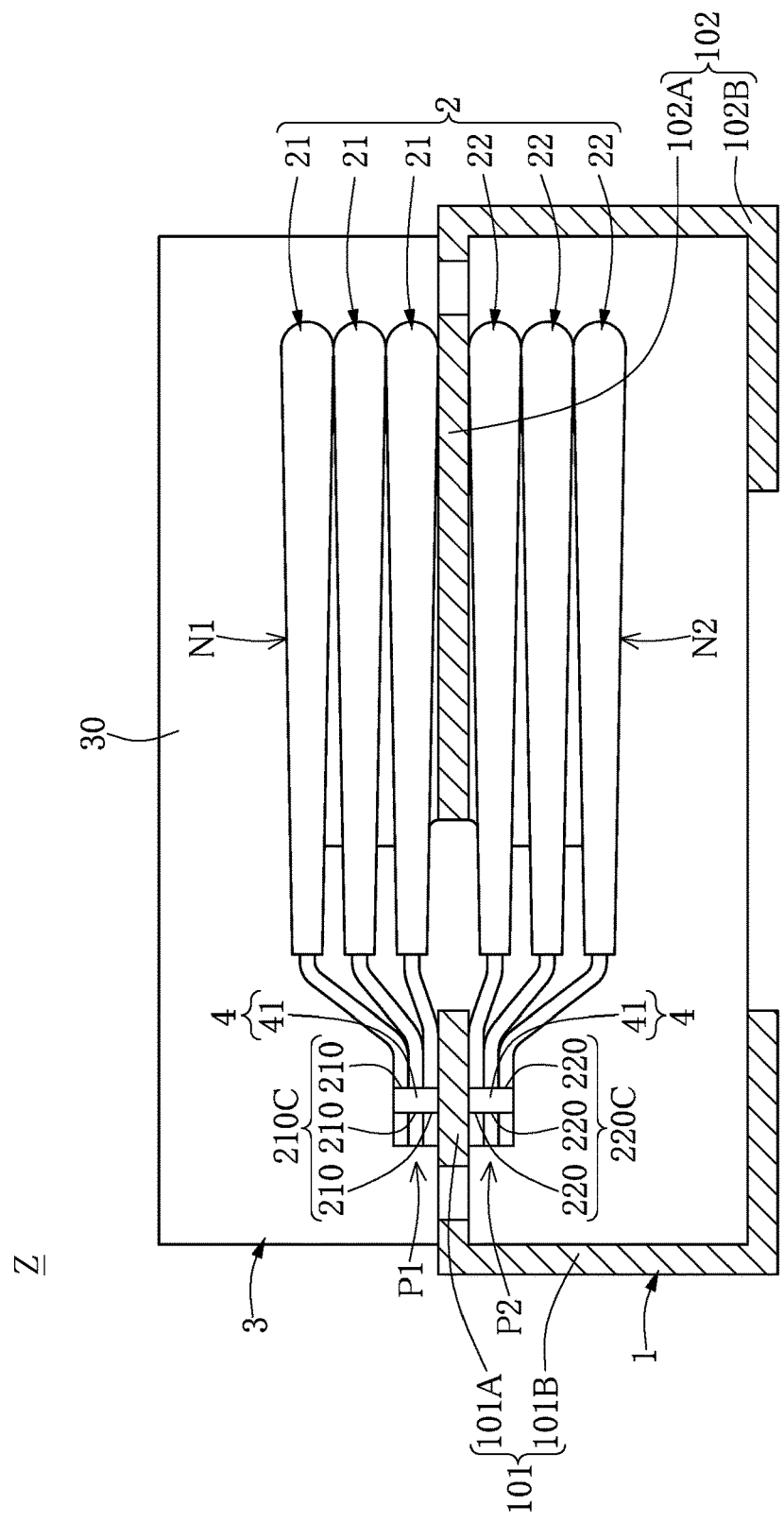
FIG. 9 shows a partial cross-sectional schematic view of the stacked-type solid electrolytic capacitor package structure according to another one of embodiments of the present disclosure.

It should be noted that the capacitor unit 2 further includes a plurality of second stacked capacitors 22 stacked on top of one another and electrically connected with each other as shown in FIG. 3, FIG. 4 and FIG. 9. The first stacked capacitors 21 are disposed on a top surface of the first embedded portion 101A of the first conductive terminal 101, and the second stacked capacitors 22 are disposed on a bottom surface of the first embedded portion 101A of the first conductive terminal 101. In addition, each second stacked capacitor 22 includes a second positive portion P2 and a second negative portion N2. The second positive portion P2 of each second stacked capacitor 22 has at least one second through hole 220 (such as a half hole or a chadless) formed on a lateral side thereof, and the second through holes 220 of the second positive portions P2 of the second stacked capacitors 22 are in communication with each other to form a second communication hole 220C. For example, the second positive portion P2 of each second stacked capacitor 22 has at least two second through holes 220 formed on the short lateral surface S of the second positive portion P2 as shown in FIG. 3.

According to the above description, referring to FIG. 1, FIG. 5 and FIG. 6, after the step S102 of electrically connecting the capacitor unit 2 between the first conductive terminal 101 and the second conductive terminal 102, further including: as shown in FIG. 5, placing a second soldering bar 42' into the second communication hole 220C (step S104B), and then referring to FIG. 6, projecting a second light source T onto the second soldering bar 42' so as to change or transform the second soldering bar 42' into at least one second connection solder 42 for filling the second communication hole 220C, in which the second positive portions P2 of the second stacked capacitors 22 are connected with each other by the at least one second connection solder 42 (step S106B). That is to say, the solder unit 4 includes at least one second connection solder 42 for filling the second communication hole 220C, so that the second positive portions P2 of the second stacked capacitors 22 can be connected with each other by the at least one second connection solder 42.

It should be noted that the second positive portions P2 of the second stacked capacitors 22 are connected with each other by the at least one second connection solder 42 so as to decrease the whole thickness of the second positive portions P2 of the second stacked capacitors 22 and increase the connection speed of the second positive portions P2 of the second stacked capacitors 22, so that the electrical impedance of the stacked-type solid electrolytic capacitor package structure Z can be decreased, and the electronic property of the stacked-type solid electrolytic capacitor package structure Z can be increased.

Figure 10:
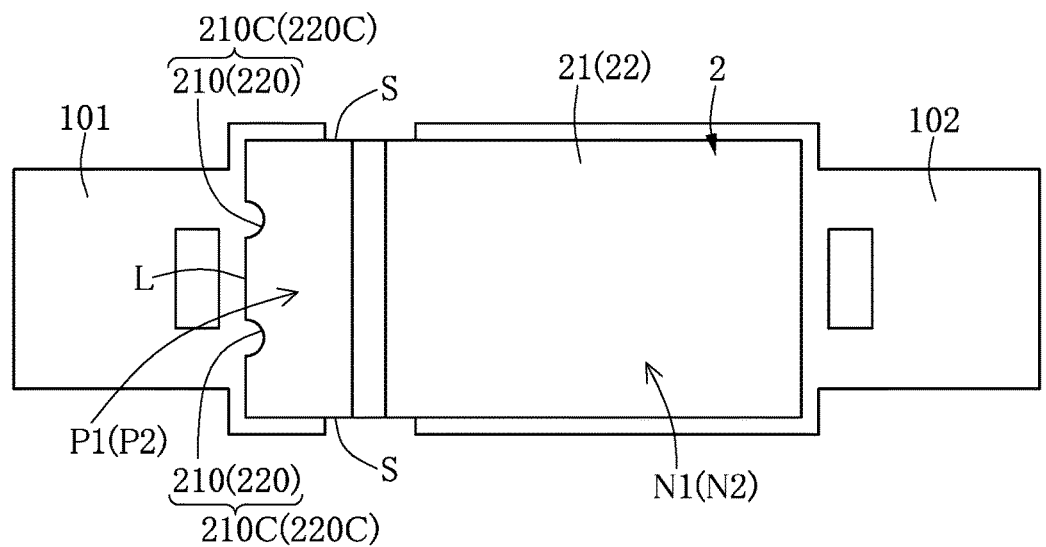
FIG. 10 shows a schematic view of at least two first through holes formed on a long lateral surface of a first positive portion according to the present disclosure.

It should be noted that the at least one first through hole 210 of the first positive portion P1 of each first stacked capacitor 21 also can be formed on the long lateral surface L of the first positive portion P1, and the at least one second through hole 220 of the second positive portion P2 of each second stacked capacitor 22 also can be formed on the long lateral surface L of the second positive portion P2, according to another embodiment as shown in FIG. 10.

Figure 11:
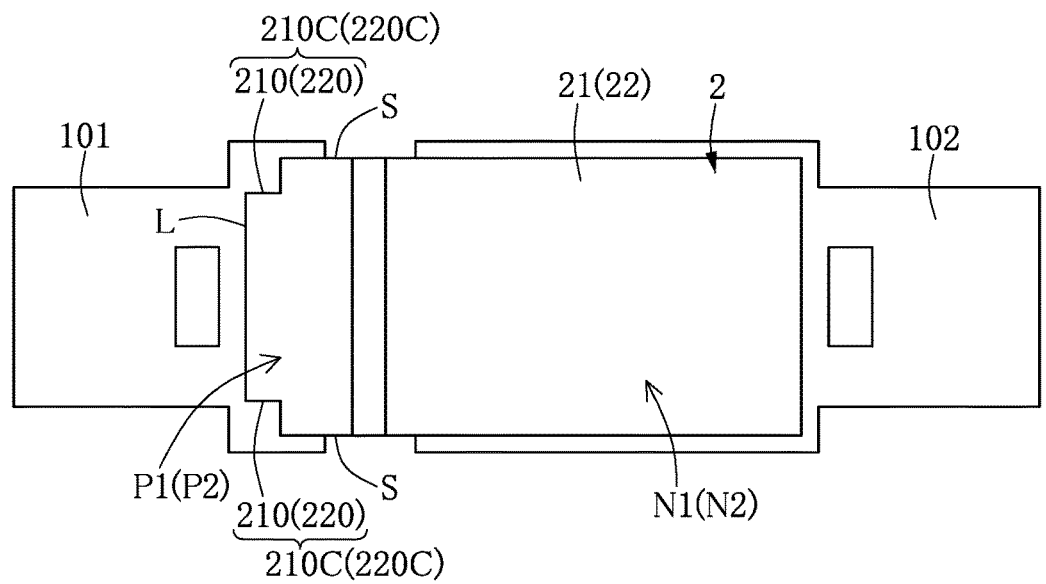
FIG. 11 shows a schematic view of at least two first through holes formed on a long lateral surface and a short lateral surface of a first positive portion according to the present disclosure.

It should be noted that the at least one first through hole 210 of the first positive portion P1 of each first stacked capacitor 21 also can be concurrently formed on the long lateral surface L and the short lateral surface S (that is a corner of the first positive portion P1) of the first positive portion P1, and the at least one second through hole 220 of the second positive portion P2 of each second stacked capacitor 22 also can be formed on the long lateral surface L and the short lateral surface S (that is a corner of the second positive portion P2) of the second positive portion P2, according to yet another embodiment as shown in FIG. 11.

Figure 12:
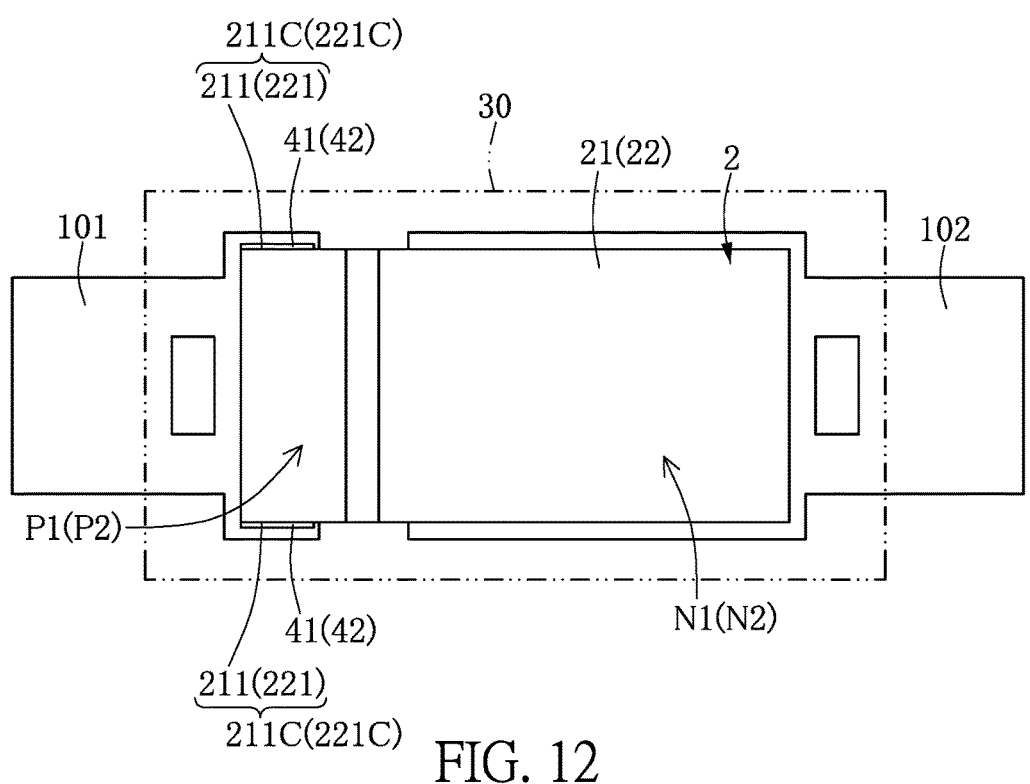
FIG. 12 shows a schematic view of two first lateral connection surfaces respectively formed on two short lateral surfaces of a first positive portion, and the first positive portions connected with each other by two first connection solders according to the present disclosure.

It should be noted that the first positive portion P1 of each first stacked capacitor 21 has at least one first lateral connection surface 211, and the first lateral connection surfaces 211 of the first positive portions P1 of the first stacked capacitors 21 are in communication with each other to form a first lateral connection area 211C, according to other embodiment as shown in FIG. 12. For example, the at least one first lateral connection surface 211 of the first positive portion P1 of each first stacked capacitor 21 can be formed on the long lateral surface L or the short lateral surface S of the first positive portion P1. In addition, the solder unit 4 includes at least one first connection solder 41 disposed on the at least one first lateral connection area 211C, so that the first positive portions P1 of the first stacked capacitors 21 can be connected with each other by the at least one first connection solder 41.

According to the above description, the capacitor unit 2 further includes a plurality of second stacked capacitors 22 stacked on top of one another and electrically connected with each other, and each second stacked capacitor 22 includes a second positive portion P2 and a second negative portion N2. In addition, the second positive portion P2 of each second stacked capacitor 22 has at least one second lateral connection surface 221, and the second lateral connection surfaces 221 of the second positive portions P2 of the second stacked capacitors 22 are in communication with each other to form a second lateral connection area 221C. In addition, the solder unit 4 includes at least one second connection solder 42 disposed on the at least one second lateral connection area 221C, so that the second positive portions P2 of the second stacked capacitors 22 can be connected with each other by the at least one second connection solder 42.

In conclusion, the first positive portion P1 of each first stacked capacitor 21 has at least one first through hole 210 formed on a lateral side thereof, and the first through holes 210 of the first positive portions P1 of the first stacked capacitors 21 are in communication with each other to form a first communication hole 210C, so that when the first communication hole 210C is filled with at least one first connection solder 41, the first positive portions P1 of the first stacked capacitors 21 can be connected with each other by the at least one first connection solder 41.

Furthermore, the first positive portion P1 of each first stacked capacitor 21 has at least one first lateral connection surface 211, and the first lateral connection surfaces 211 of the first positive portions P1 of the first stacked capacitors 21 are in communication with each other to form a first lateral connection area 211C, so that so that when at least one first connection solder 41 is disposed on the at least one first lateral connection area 211C, the first positive portions P1 of the first stacked capacitors 21 can be connected with each other by the at least one first connection solder 41.

It should be noted that when the first positive portions P1 of the first stacked capacitors 21 are connected with each other by the at least one first connection solder 41, the whole thickness of the first positive portions P1 of the first stacked capacitors 21 is decreased and the connection speed of the first positive portions P1 of the first stacked capacitors 21 is increased, so that the electrical impedance of the stacked-type solid electrolytic capacitor package structure Z can be decreased, and the electronic property of the stacked-type solid electrolytic capacitor package structure Z can be increased.

The aforementioned descriptions merely represent the preferred embodiments of the present disclosure, without any intention to limit the scope of the present disclosure which is fully described only within the following claims. Various equivalent changes, alterations or modifications based on the claims of the present disclosure are all, consequently, viewed as being embraced by the scope of the present disclosure.

What is claimed is:

1. A stacked-type solid electrolytic capacitor package structure, comprising:
   a capacitor unit including a plurality of first stacked capacitors stacked on top of one another and electrically connected with each other, wherein each first stacked capacitor includes a first positive portion and a first negative portion, the first positive portion of each first stacked capacitor has at least one first through hole formed on a lateral side thereof, and the first through holes of the first positive portions of the first stacked capacitors are in communication with each other to form a first communication hole;
   a solder unit including at least one first connection solder for filling the first communication hole, wherein the first positive portions of the first stacked capacitors are connected with each other by the at least one first connection solder;

a package unit including a package body for enclosing the capacitor unit and the solder unit; and a conductive unit including a first conductive terminal and a second conductive terminal separated from the first conductive terminal, wherein the first conductive terminal has a first embedded portion electrically connected to the first positive portion of the first stacked capacitor and enclosed by the package body, and a first exposed portion connected to the first embedded portion and exposed outside the package body, wherein the second conductive terminal has a second embedded portion electrically connected to the first negative portion of the first stacked capacitor and enclosed by the package body, and a second exposed portion connected to the second embedded portion and exposed outside the package body.

2. The stacked-type solid electrolytic capacitor package structure of claim 1, wherein the first positive portion of each first stacked capacitor has a long lateral surface and two short lateral surfaces respectively connected to two opposite sides of the long lateral surface, and the at least one first through hole of the first positive portion of each first stacked capacitor is formed on the long lateral surface or the short lateral surface of the first positive portion.

3. The stacked-type solid electrolytic capacitor package structure of claim 1, wherein each first stacked capacitor includes a valve metal foil, an oxide layer for totally enclosing the valve metal foil, a conductive polymer layer for partially enclosing the oxide layer, a carbon paste layer for totally enclosing the conductive polymer layer, and a silver paste layer for totally enclosing the carbon paste layer, wherein each first stacked capacitor has a surrounding insulation layer disposed on and around an outer surface of the oxide layer, and the lengths of the conductive polymer layer, the carbon paste layer and the silver paste layer of each first stacked capacitor are limited by the surrounding insulation layer, wherein the oxide layer has a surrounding region formed on the outer surface thereof, and the surrounding insulation layer of each first stacked capacitor is surroundingly disposed on the surrounding region of the oxide layer to contact an end of the conductive polymer layer, an end of the carbon paste layer and an end of the silver paste layer.

4. The stacked-type solid electrolytic capacitor package structure of claim 1, wherein the capacitor unit includes a plurality of second stacked capacitors stacked on top of one another and electrically connected with each other, the first stacked capacitors are disposed on a top surface of the first embedded portion of the first conductive terminal, and the second stacked capacitors are disposed on a bottom surface of the first embedded portion of the first conductive terminal, wherein each second stacked capacitor includes a second positive portion and a second negative portion, the second positive portion of each second stacked capacitor has at least one second through hole formed on a lateral side thereof, and the second through holes of the second positive portions of the second stacked capacitors are in communication with each other to form a second communication hole, wherein the solder unit includes at least one second connection solder for filling the second communication hole, and the second positive portions of the second stacked capacitors are connected with each other by the at least one second connection solder.

* * * * *